UNITED STATES PATENT OFFICE.

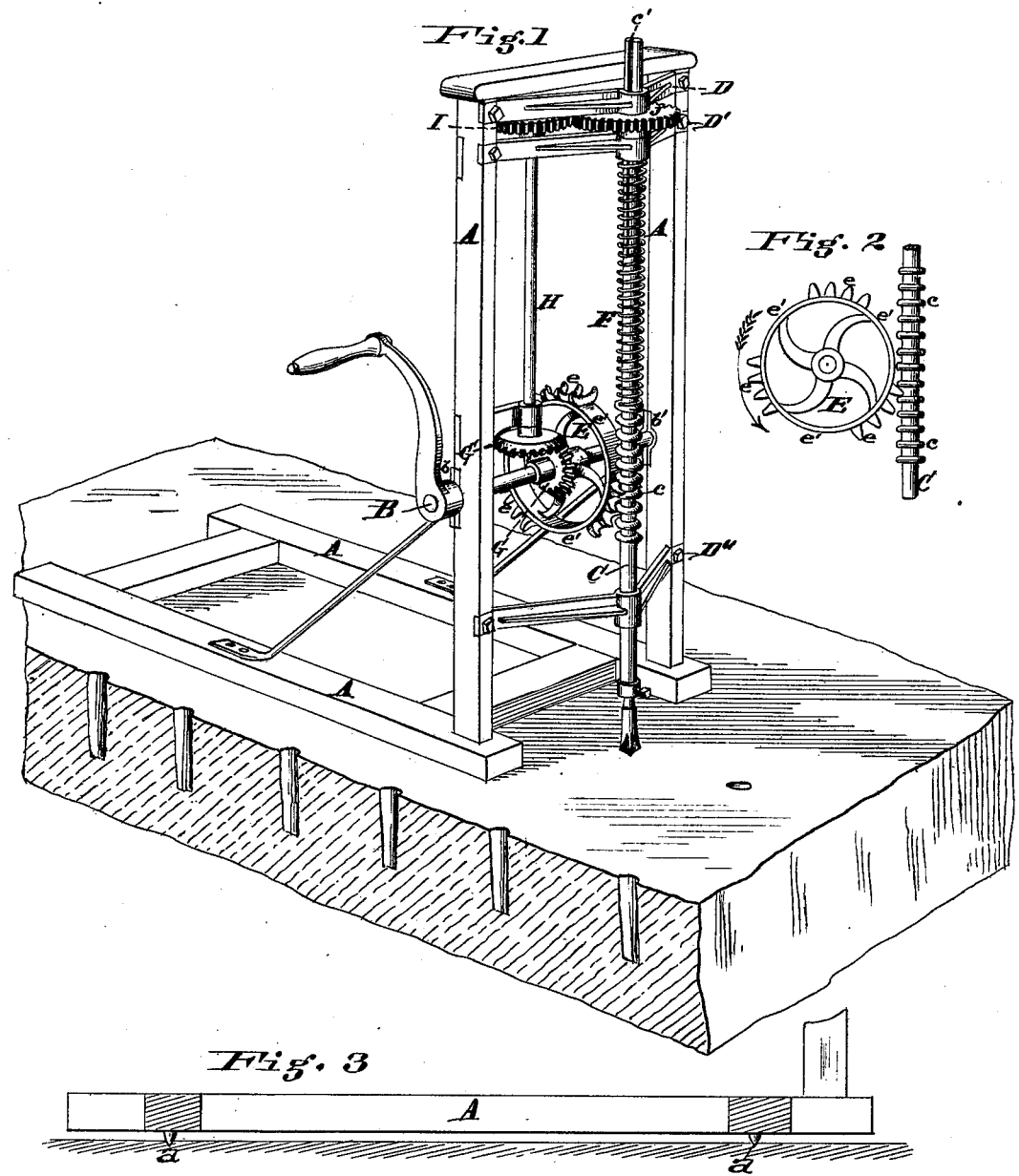

SAMUEL C. NICHOLS, OF CINCINNATI, OHIO, ASSIGNOR TO HIMSELF AND THOMAS B. PAXTON, OF SAME PLACE.

IMPROVEMENT IN STONE-DRILLING MACHINES.

Specification forming part of Letters Patent No. 195,638, dated September 25, 1877; application filed March 19, 1877.

*To all whom it may concern:*

Be it known that I, SAMUEL C. NICHOLS, of Cincinnati, Hamilton county, State of Ohio, have invented an Improvement in Stone-Drills, of which the following is a specification:

My invention relates to the class of devices for elevating and rotating a spindle for drilling rock; and consists in the combination of a drill-spindle, having a series of collars at equal distances apart forming a rack capable of rotation, and a wheel armed with teeth, in sets, at intervals on its periphery, the teeth fitting between the collars of the spindle, and serving to elevate it, and the spaces in the wheel between the sets of teeth serving to permit the spindle to fall at regular intervals, together with a system of gearing in connection with this wheel having teeth and gaps, and the spindle formed with collars, which acts to give a rotary motion to the drill both while rising and falling.

In the accompanying drawings, Figure 1 is a perspective view of a machine embracing my invention. Fig. 2 is an elevation of the elevating-wheel and part of drill-spindle. Fig. 3 is a sectional elevation of the lower part of the frame of the machine, showing the spikes which assist in holding the frame in a given position while drilling a hole.

A is the frame of the machine; B, the driving-shaft, to which the power is applied; and C, the drill-spindle. The shaft B is journaled in the bearings $b$ $b'$, and the drill-spindle is fitted to slide vertically in the brackets D D' D''. The elevating-wheel E is secured to shaft B, and it is formed with one or more sets, $e$, of teeth, and the spindle C is formed with a series of collars, $c$, which closely fit the spaces between the teeth of wheel E. Between the sets $e$ of teeth on wheel E spaces or gaps $e'$ are left, which, after each set of teeth has operated to elevate the drill, permit it to drop for the performance of its purpose; and the velocity of the fall may be increased by the intervention of the spring F.

To give the rotary motion to the drill, I provide a pair of miter-wheels, G G', shaft H, and spur-wheels I J, connected, as shown, the wheel J being fitted between the brackets D D', and the spindle C adapted to slide through it.

To cause the spindle C and wheel J to rotate together the usual "feather and groove" device is employed, the spindle C having a groove, $c'$, in which a feather, projecting inwardly from wheel J, slides.

The frame A has points or spikes $a$, to assist in holding the machine in place. It is shown in the drawing as engaged in drilling holes, to facilitate (in the usual way) the cutting up of "dimension stone."

I claim—

The combination of spindle C $c$ $c'$, spring F encircling said spindle, wheel E $e$, wheels G G' I J, and shaft H, substantially as and for the purpose specified.

In testimony of which invention I hereunto set my hand.

SAM. C. NICHOLS.

Witnesses:
CHAS. D. MOORE,
W. L. THOMPSON.